(12) United States Patent
Yoshitsune et al.

(10) Patent No.: US 9,027,936 B2
(45) Date of Patent: May 12, 2015

(54) GASKET

(75) Inventors: Shuji Yoshitsune, Aso (JP); Masaru Ito, Makinohara (JP); Tomoyuki Koyama, Makinohara (JP); Seiji Tani, Tokyo (JP)

(73) Assignees: Nok Corporation, Tokyo (JP); Mahle Filter Systems Japan Corporation, Tokyo (JP)

( * ) Notice: Subject to any disclaimer, the term of this patent is extended or adjusted under 35 U.S.C. 154(b) by 98 days.

(21) Appl. No.: 13/125,167

(22) PCT Filed: Jul. 23, 2009

(86) PCT No.: PCT/JP2009/063189
§ 371 (c)(1),
(2), (4) Date: Apr. 20, 2011

(87) PCT Pub. No.: WO2010/047165
PCT Pub. Date: Apr. 29, 2010

(65) Prior Publication Data
US 2011/0193298 A1    Aug. 11, 2011

(30) Foreign Application Priority Data
Oct. 23, 2008   (JP) .................................. 2008-272774

(51) Int. Cl.
*F16J 15/06*    (2006.01)

(52) U.S. Cl.
CPC ..................... *F16J 15/061* (2013.01)

(58) Field of Classification Search
USPC ................................................ 277/648, 628
See application file for complete search history.

(56) References Cited

U.S. PATENT DOCUMENTS 2,954,264 A * 9/1960 Tisch et al. .................... 277/630
5,390,939 A * 2/1995 Terauchi et al. .............. 277/650
(Continued)

FOREIGN PATENT DOCUMENTS

EP    1900981 A1    3/2008
JP    11-248002     9/1999
(Continued)

OTHER PUBLICATIONS

Revilla, Xavier, Extended European Search Report, Aug. 23, 2013, Munich, Germany.

*Primary Examiner* — Kristina Fulton
*Assistant Examiner* — Eugene G Byrd
(74) *Attorney, Agent, or Firm* — Harness, Dickey & Pierce, P.L.C.

(57) ABSTRACT

A gasket is provided which is intended to improve its sealing performance by attaining a further stabilization of the posture thereof in a groove. In a gasket (100) in which a protruded part (110), which serves to stabilize the posture of the gasket (100) in a groove (201) by being in contact with an inner wall surface of the groove (201) in a state where the gasket is sandwiched by a head cover (200) and a cylinder head, is continuously formed in a longitudinal direction of the gasket (100), the protruded part (110) is characterized by a stepped structure which includes a first protruded portion (111) with the largest amount of protrusion that is formed along the vicinity of a center of a gasket main body, a second protruded portion (112) with the smallest amount of protrusion that is formed at the side of the head cover (200), and a third protruded portion (113) that is formed at the side of the cylinder head, and has an amount of protrusion which is smaller than that of the first protruded portion (111), and larger than that of the second protruded portion (112).

3 Claims, 5 Drawing Sheets

(56) References Cited

U.S. PATENT DOCUMENTS

| | | | |
|---|---|---|---|
| 5,662,337 A * | 9/1997 | Surbrook et al. | 277/594 |
| 6,102,410 A * | 8/2000 | Hotta | 277/648 |
| 6,264,206 B1 * | 7/2001 | Hashizawa et al. | 277/641 |
| 6,722,660 B2 * | 4/2004 | Gernand et al. | 277/591 |
| 7,413,099 B2 * | 8/2008 | Takahashi et al. | 220/806 |
| 7,938,406 B2 * | 5/2011 | Matsumoto et al. | 277/637 |
| 7,959,161 B2 * | 6/2011 | Seki et al. | 277/648 |
| 8,075,025 B2 * | 12/2011 | Smith, III | 285/374 |
| 2006/0290075 A1 * | 12/2006 | Tani | 277/628 |
| 2009/0261534 A1 * | 10/2009 | Pradelle | 277/648 |
| 2010/0044970 A1 * | 2/2010 | Suzuki et al. | 277/592 |
| 2010/0140881 A1 * | 6/2010 | Matsuo | 277/648 |

FOREIGN PATENT DOCUMENTS

| | | |
|---|---|---|
| JP | 2002-364754 A | 12/2002 |
| JP | 2003-269613 A | 9/2003 |
| JP | 2007-002927 A | 1/2007 |
| JP | 2007-232014 A | 9/2007 |

* cited by examiner

GASKET

CROSS-REFERENCE TO RELATED APPLICATIONS

This application is a National Stage of International Application No. PCT/JP2009/063189, filed Jul. 23, 2009, which claims priority to Japanese Application No. 2008-272774, filed Oct. 23, 2008. The entire disclosures of each of the above applications are incorporated herein by reference.

TECHNICAL FIELD

The present invention relates to a gasket for sealing a gap between two members.

BACKGROUND ART

As a gasket for sealing a gap between two members, there has been known one that is mounted in a groove formed in one of the two members. Such a gasket exerts sealing performance by being made into close contact with the two members, respectively, under the action of a repulsive force which is produced when the gasket is compressed by the two members.

Here, in cases where either one of the two members is composed of a material of low rigidity, it may be deformed when the repulsive force of the gasket is too large. As a result, defects such as reduction in sealing performance will arise. Accordingly, in order to make the repulsive force smaller, a measure is taken in which the width of the gasket in a state of being not clamped or sandwiched by the two members is constructed to be narrower than the width of the groove.

In the case of such a gasket, the gasket may fall or buckle in the groove. As a result, it is difficult to stabilize the posture of the gasket, so it is an important problem how to stabilize the posture. For example, in order to stabilize the posture of the gasket, the cross sectional shape of the gasket is made to be right-left asymmetry. Thus, there has been known a technique in which with such a shape, the gasket is made liable to fall in a desired direction at the time of compression thereof, so that the posture of the gasket in the groove is thereby stabilized (see a first patent document).

However, it may be difficult to make the gasket fall so as to take a desired posture, and hence it is much more desired to attain stabilization of the posture of the gasket in the groove. In addition, in the case of a gasket the width of which is narrower than the width of the groove, in an assembly operation, the gasket is liable to come out of the groove. For this reason, it is also desired to adopt a construction in which the gasket does not come out of the groove.

PRIOR ART REFERENCES

Patent Documents

First Patent Document: Japanese patent application laid-open No. 2007-002927

SUMMARY OF THE INVENTION

Problems to be Solved by the Invention

The object of the present invention is to provide a gasket which is intended to improve its sealing performance by attaining a further stabilization of the posture thereof in a groove.

Means for Solving the Problems

In order to solve the above-mentioned problems, the present invention adopts the following means.

That is, a gasket of the present invention resides in a gasket which is fitted in a groove formed in one of two members and which serves to seal a gap between these two members, and which is characterized in that a protruded part is continuously formed in a longitudinal direction of the gasket, said protruded part being formed such that it protrudes toward a hermetic seal area side in a range in which the gasket is out of contact with an inner wall surface of the groove, in a state where the gasket is fitted in said groove and is not sandwiched by said two members, whereas it is in contact with the inner wall surface of the groove thereby to stabilize the posture of the gasket in the groove, in a state where the gasket is sandwiched by said two members; and said protruded part is of a stepped structure which includes:

a first protruded portion with the largest amount of protrusion that is formed along the vicinity of a center of a gasket main body;

a second protruded portion with the smallest amount of protrusion that is formed at a location nearer to the side of said one member than the first protruded portion; and a third protruded portion that is formed at a location nearer to the side of the other member of said two members than the first protruded portion, and has an amount of protrusion which is smaller than that of the first protruded portion, and larger than that of the second protruded portion.

According to the gasket of the present invention, as the protruded part which stabilizes the posture of the gasket in the groove, there is adopted one of the stepped structure which includes the first, the second, and the third protruded portions, of which the amounts of protrusion are different from one another, as stated above.

As a result of this, when the gasket is compressed by the two members, in the protruded part, the first protruded portion with the largest amount of protrusion first comes into contact with the inner wall surface of the groove. Accordingly, the buckling of the gasket can be suppressed in a suitable manner. In the present invention, the amount of protrusion of the first protruded portion, which is formed along the vicinity of the center of the gasket main body, is made the largest, and this first protruded portion first comes into contact with the inner wall surface of the groove. As a result, it is possible to prevent the buckling in a suitable manner.

In addition, in this invention, the amount of protrusion of the second protruded portion at the side of the one member (in other words, at the side of a bottom of the groove) is made the smallest. Accordingly, an increase in a repulsive force accompanying an increase in a filling rate can be suppressed. That is, a factor for the increase in the repulsive force is the filling rate of the gasket in the inside of the groove, in particular in the vicinity of the groove bottom. In the present invention, by making the smallest the amount of protrusion of the second protruded portion, which is at the groove bottom side (at the side of the one member), among the protruded part for stabilizing the posture of the gasket, the increase in the filling rate can be suppressed, while preventing the falling and buckling of the gasket.

Moreover, in this invention, the amount of protrusion of the third protruded portion at the side of the other member is set to be smaller than the amount of protrusion of the first protruded portion, and larger than the amount of protrusion of the second protruded portion. Accordingly, the falling of the gasket can be suppressed in a suitable manner. That is, the gasket is compressed by the bottom of the groove, which is formed in the one member, and the other member. In the process of this compression, that portion of the gasket which is received in the groove is in contact with the inner wall surface of the groove, so its deformation is suppressed. In contrast to this, the other portion of the gasket which is not received in the groove is liable to deform. Thus, in cases where the gasket is compressed by the two members, the cause for the occurrence of falling of the gasket is mainly the deformation of that portion of the gasket which is not received in the groove (in other words, the portion thereof at the side of the other member). In this invention, it is constructed such that the amount of protrusion of the third protruded portion, which is at the side of the other member, among the protruded part for stabilizing the posture of the gasket, is made large to some extent (i.e., is made smaller than the amount of protrusion of the first protruded portion of which the amount of protrusion is made high in order to prevent the buckling of the gasket, and is made larger than the amount of protrusion of the second protruded portion at the side of the one member). By this, following the first protruded portion, the second protruded portion comes into contact with the inner wall surface of the groove, so it is possible to suppress the deformation of the gasket in the vicinity of the side of the other member, and hence it is possible to suppress the falling of the gasket in a suitable manner. In addition, it is possible to prevent the gasket from protruding out of the groove and being bitten at the time of compression thereof.

As described above, according to the present invention, the protruded part for stabilizing the posture of the gasket is constructed so that the amount of protrusion thereof can be varied according to requirements demanded to individual portions thereof, respectively. By doing so, it is possible to suppress the buckling and falling of the gasket while suppressing the increase in the repulsive force at the time when the gasket is compressed by the two members, whereby the posture of the gasket can be stabilized.

In addition, protrusions, which serve to prevent the gasket from coming out of the groove by being in contact with an inner wall surface of the groove even in a state where the gasket is fitted in said groove and is not sandwiched by said two members, may be formed in plurality in a longitudinal direction of the gasket at intervals therebetween, respectively, and said protrusions may be arranged at locations which are nearer to a groove bottom than a center position of the gasket main body, and at which they are received in the groove in a state where the gasket is fitted in said groove and is not sandwiched by said two members.

With such an arrangement, it is possible to suppress the gasket from coming out of the groove in an effective manner, thereby improving the mountability thereof at the time of fitting the gasket into the groove.

Further, the dimension in a groove depth direction of said protrusions may be set to be equal to or more than 30% and equal to or less than 50% with respect to the depth dimension of said groove.

As a result of this, the increase in the filling rate can be suppressed, thus making it possible to suppress the increase in the repulsive force.

Effect of the Invention

As explained above, according to the present invention, it is possible to make improvements in sealing performance by attaining further stabilization of the posture of the gasket in the groove.

BEST MODE FOR CARRYING OUT THE INVENTION

Hereinafter, the best mode for carrying out the present invention will be described in detail by way of example based on a preferred embodiment thereof with reference to the attached drawings. However, the dimensions, materials, shapes, relative arrangements and so on of component parts described in this embodiment are not intended to limit the scope of the present invention to these alone in particular as long as there are no specific statements.

Embodiment

Hereinafter, a gasket according to an embodiment of the present invention will be explained while referring to FIGS. 1 through 7. Here, note that in this embodiment, description will be made by taking, as an example, a gasket which is fitted in a groove formed in a head cover and which is used for the purpose of sealing a gap between the head cover (one of two members) and a cylinder head (the other of the two members).

<Gasket as a Whole>

Figure 1:
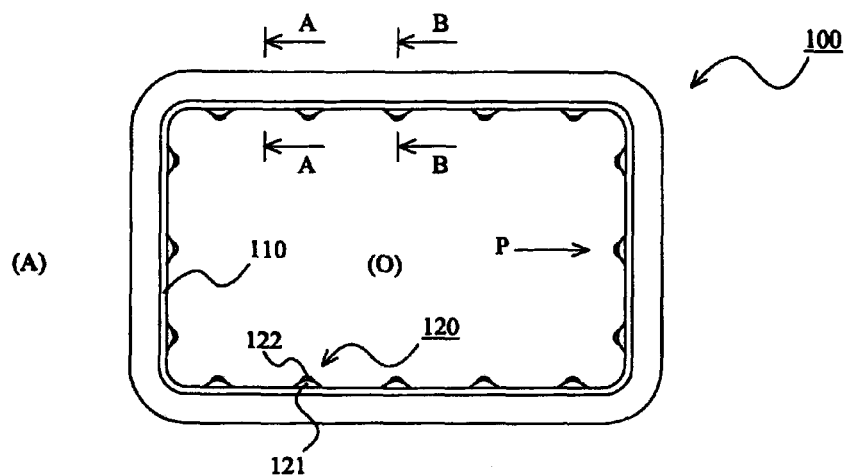
FIG. 1 is a plan view of a gasket according to an embodiment of the present invention.
Figure 2:
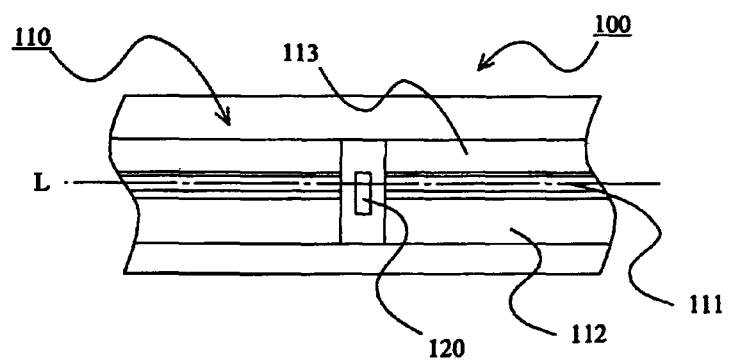
FIG. 2 is a part of side elevation of the gasket according to the embodiment of the present invention.
Figure 3:
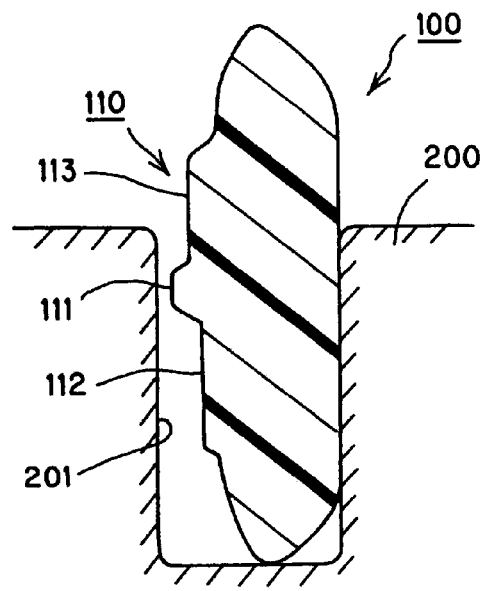
FIG. 3 is a schematic cross sectional view showing a state in which the gasket is fitted in a groove according to the embodiment of the present invention.
Figure 4:
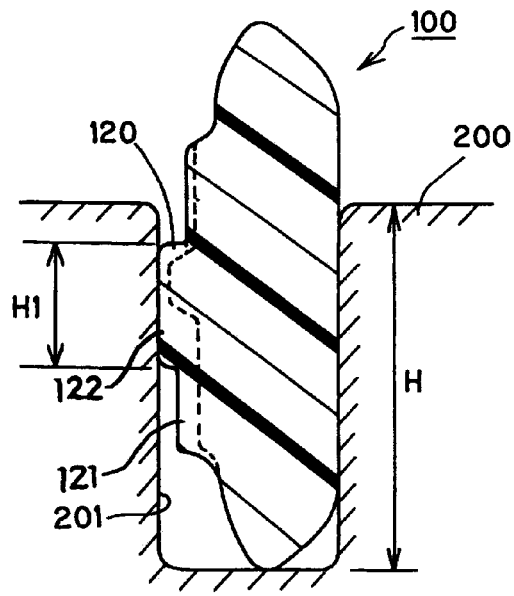
FIG. 4 is another schematic cross sectional view showing a state in which the gasket is fitted in the groove according to the embodiment of the present invention.
Figure 5:
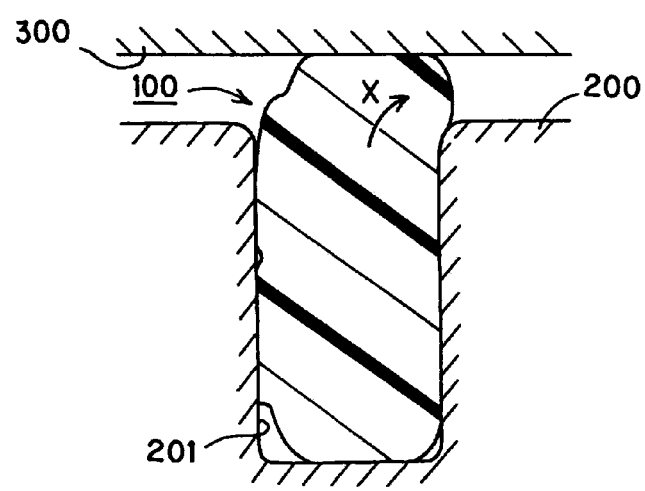
FIG. 5 is a schematic cross sectional view showing a state in which the gasket is sandwiched of two members according to the embodiment of the present invention.

Hereinafter, the overall structure of the gasket according to the embodiment of the present invention will be explained while referring to FIGS. 1 through 5. FIG. 1 is a plan view of the gasket according to the embodiment of the present invention. FIG. 2 is a part of side elevation of the gasket according to the embodiment of the present invention. Here, note that FIG. 2 is a view seen in a direction of P in FIG. 1. FIG. 3 and FIG. 4 are schematic cross sectional views showing a state in which the gasket is fitted in the groove according to the embodiment of the present invention. Here, note that the gasket in FIG. 3 corresponds to an AA cross sectional view in FIG. 1, and the gasket in FIG. 4 corresponds to a BB cross sectional view in FIG. 1. FIG. 5 is a schematic cross sectional view showing a state in which the gasket is sandwiched of two members according to the embodiment of the present invention. Here, note that the gasket in FIG. 5 is shown in a compressed state of an AA cross sectional part in FIG. 1.

The gasket 100 according to this embodiment is fitted in a groove 201 formed in the head cover 200, and serves to seal a gap between the head cover 200 and the cylinder head 300. In FIG. 1, (O) indicates a hermetic seal area side, and (A) indicates an outer side (atmospheric air side). When the head cover 200 and the cylinder head 300 are assembled with each other, a hermetic seal area is formed in the inside thereof. The gasket 100 prevents an oil in this hermetic seal area from leaking out to the outside from the gap between the head cover 200 and the cylinder head 300.

In the gasket 100 according to this embodiment, a protruded part 110 for stabilizing the posture of the gasket 100 in the groove 201 is formed on a side surface of the gasket 100 at a side thereof which is in the hermetic seal area. Here, note that in a state in which the gasket 100 has been compressed, an end of the gasket 100 at the side of the cylinder head 300 deforms in such a manner that it is inclined toward the outer side (A). Accordingly, the above-mentioned protruded part 110 is formed on a surface of the gasket 100 at a side opposite to the side in the direction of which the gasket 100 deforms so as to incline. Also, this protruded part 110 is continuously arranged in the longitudinal direction of the gasket 100. That is, as shown in FIG. 1, the protruded part 110 is formed over the entire circumference of an inner peripheral side surface of the gasket 100. In addition, it is constructed such that in a state where the gasket 100 is fitted in the groove 201 and is not sandwiched between the head cover 200 and the cylinder head 300, this protruded part 110 protrudes toward the hermetic seal area side (O) within a range in which it is out of contact with an inner wall surface of the groove 201 (see FIG. 3). Then, in a state where the gasket 100 is sandwiched between the head cover 200 and the cylinder head 300, this protruded part 110 is in contact with the inner wall surface of the groove 201 (see FIG. 5). As a result of this, a function to stabilize the posture of the gasket 100 in the groove 201 is exhibited.

In addition, in the gasket 100 according to this embodiment, protrusions 120 for preventing the gasket 100 from coming out of the groove 201 are formed on the side surface of the gasket 100 at the side thereof which is in the hermetic seal area. These protrusions 120 are arranged in plurality at individual intervals therebetween in the longitudinal direction of the gasket 100, respectively, (see FIG. 1). In addition, it is constructed such that even in a state where the gasket 100 is fitted in the groove 201 and is not sandwiched between the head cover 200 and the cylinder head 300, these protrusions 120 are in contact with the inner wall surface of the groove 201 (see FIG. 4). As a result, the protrusions 120 exhibit a function to prevent the gasket 100 from coming out of the groove 201. Here, note that in this embodiment, each of the protrusions 120 comprises a protrusion main portion 121 and a small protrusion portion 122 of a narrow width which is formed at the tip of the protrusion main portion 121 (see FIG. 1). This small protrusion portion 122 is constructed in such a manner that the length thereof in a depth direction is comparatively short, and the cross section thereof perpendicular to the depth direction is in the shape of a semicircle with a small diameter. With such a construction, it is possible for the protrusions to exert a come-out preventing function while reducing an insertion force at the time when the gasket 100 is fitted into the groove 201. In addition, it is also possible to position the gasket 100 at a desired location by means of these protrusions 120.

<Details of the Protruded Part>

Hereinafter, the protruded part 110 in the gasket 100 according to the embodiment of the present invention will be explained in further detail while referring to FIG. 2 and FIG. 3.

In this embodiment, the protruded part 110 adopts a stepped structure. That is, the protruded part 110 is of a three-step structure which includes a first protruded portion 111 that is formed along the vicinity of the center of a gasket main body, a second protruded portion 112 that is formed at the side of the head cover 200 (i.e., at the side of a groove bottom), and a third protruded portion 113 that is formed at the side of the cylinder head 300.

Then, in the protruded part 110, the amount of protrusion of the first protruded portion 111 is the largest, and the amount of protrusion of the second protruded portion 112 is the smallest. In addition, the amount of protrusion of the third protruded portion 113 is set in such a manner that it is smaller than that of the first protruded portion 111, and is larger than that of the second protruded portion 112.

<Details of the Protrusions>

Hereinafter, the protrusions 120 in the gasket 100 according to the embodiment of the present invention will be explained in further detail while referring to FIG. 2 and FIG. 4.

In this embodiment, the protrusions 120 are formed at locations which are nearer to the side of the groove bottom than the center position of the gasket main body. Here, note that in FIG. 2, an alternate long and short dash line L represents substantially the center of the gasket main body in a height direction thereof (i.e., in a depth direction of the groove 201). Also, these protrusions 120 are arranged at locations at which they are received in the groove 201 in a state where the gasket 100 is fitted in the groove 201 and is not sandwiched between the head cover 200 and the cylinder head 300 (see FIG. 4). In addition, the dimension in the groove depth direction of the protrusions 120 (dimension H1 in FIG. 4) is set to be equal to or more than 30% and equal to or less than 50% with respect to the depth dimension of the groove 201 (dimension H in FIG. 4).

<Behavior of the Gasket>

The behavior of the gasket 100 in the process of the assembly of the head cover 200 and the cylinder head 300, and at the time of the completion of the assembly thereof will be explained in particular with reference to FIG. 5. In this embodiment, first of all, the gasket 100 is made to fit into the groove 201 of the head cover 200. Then, the head cover 200 is assembled to the cylinder head 300. As a result of this, the gasket 100 is compressed by the head cover 200 (the groove bottom of the groove 201) and the cylinder head 300.

As stated above, in the state of gasket 100 before the compression thereof, the protruded part 110 in the gasket 100 is not in contact with the inner wall surface of the groove 201. Thereafter, in the compression process, the first protruded portion 111 with the largest amount of protrusion first comes in contact with the inner wall surface of the groove 201, and then, the third protruded portion 113 comes in contact therewith, and finally, the second protruded portion 112 with the smallest amount of protrusion comes in contact therewith.

In this manner, the gasket 100 is compressed by the head cover 200 and the cylinder head 300, so that it exhibits sealing performance by being made into close contact with these members, respectively, under the action of a repulsive force thus generated. Here, in this embodiment, in the state where the assembly of the head cover 200 and the cylinder head 300 has been completed, a gap is ensured between these members (see FIG. 5).

<Advantageous Features of this Embodiment>

As described above, in the gasket 100 according to this embodiment, the stepped structure is adopted as the protruded part 110 which serves to stabilize the posture of the gasket 100 in the groove 201. Then, when the gasket 100 is compressed by the head cover 200 and the cylinder head 300, the first protruded portion 111 with the largest amount of protrusion first comes into contact with the inner wall surface of the groove 201. Accordingly, the buckling of the gasket 100 can be suppressed in a suitable manner.

That is, when the gasket 100 is compressed by the head cover 200 and the cylinder head 300, stress is liable to be concentrated on the vecinity of the center of the gasket main body, and hence a buckling of the gasket is liable to occur from the vicinity of the center of the gasket main body. However, in the gasket 100 according to this embodiment, the amount of protrusion of the first protruded portion 111 formed along the vicinity of the center of the gasket main body is made the largest, so that this first protruded portion 111 first comes into contact with the inner wall surface of the groove 201, thereby making it possible to prevent the buckling of the gasket in a suitable manner. In addition, because the vicinity of the center of the gasket 100 first comes into contact with the inner wall surface of the groove 201, one end of the gasket at the side of the cylinder head 300 can be made to deform upon compression of the gasket 100 so that it is inclined toward the outer side (A), in a more reliable manner. Furthermore, in a state where the gasket 100 is fitted in the groove 201, the first protruded portion 111 can be made to position at a desired location in a more reliable manner.

Then, in the gasket 100 according to this embodiment, the amount of protrusion of the second protruded portion 112 at the side of the head cover 200 (in other words, at the groove bottom side of the groove 201) is made the smallest. Accordingly, an increase in the repulsive force accompanying an increase in a filling rate can be suppressed. That is, a factor for the increase in repulsive force is the filling rate of the gasket 100 in the inside of the groove 201, in particular in the vicinity of the groove bottom. In the gasket 100 according to this embodiment, the increase in the filling rate can be suppressed by making the smallest the amount of protrusion of the second protruded portion 112 which is at the side of the groove bottom. Here, note that in a state where the gasket 100 has been compressed, the second protruded portion 112 is set to has a rigidity suitable to cause a tip end of the gasket 100 at the side of the groove bottom to fall in an intended manner. According to this, a repulsive force suitable to obtain sealing performance can be generated and at the same time the filling rate is made low to suppress the increase of the repulsive force.

In addition, in the gasket 100 according to this embodiment, the amount of protrusion of the third protruded portion 113 at the side of the cylinder head 300 is set to be smaller than the amount of protrusion of the first protruded portion 111, and larger than the amount of protrusion of the second protruded portion 112. Accordingly, the falling of the gasket 100 can be suppressed in a suitable manner. That is, the gasket 100 is compressed by the groove bottom of the groove 201 formed in the head cover 200 and the cylinder head 300. In the process of this compression, that portion of the gasket 100 which is received in the groove is in contact with the inner wall surface of the groove 201, so its deformation is suppressed. In contrast to this, the other portion of the gasket 100 which is not received in the groove is liable to deform. Thus, in cases where the gasket 100 is compressed, the cause for the occurrence of falling of the gasket 100 is mainly the deformation of that portion of the gasket 100 which is not received in the groove (in other words, the portion thereof at the side of the cylinder head 300).

In this embodiment, it is constructed such that the amount of protrusion of the third protruded portion 113, which is at the side of the cylinder head 300 among the protruded part 110 for stabilizing the posture of the gasket 100, is made large to some extent. In other words, the amount of protrusion of the third protruded portion 113, being smaller than the amount of protrusion of the first protruded portion 111 of which the amount of protrusion is made high in order to prevent the buckling of the gasket, is made larger than the amount of protrusion of the second protruded portion 112 at the side of the head cover 200. By this, following the first protruded portion 111, the second protruded portion 112 comes into contact with the inner wall surface of the groove 201, so it is possible to suppress the deformation of the gasket in the vicinity of the side of the cylinder head 300. That is, in FIG. 5, the deformation of the gasket in the direction of an arrow X can be suppressed. Accordingly, the falling of the gasket 100 inside the groove 201 can be suppressed in a suitable manner. Here, note that the third protruded portion 113 is constructed such that at the time when the gasket 100 is compressed, it has a rigidity of such a level as to be capable of preventing the gasket from protruding into the gap between the cylinder head 300 and the head cover 200, and from being bitten or clawed by these members, as well as a rigidity of such a level that the end portion of the gasket 100 at the side of the cylinder head 300 can be caused to fall in an intended manner.

Figure 6:
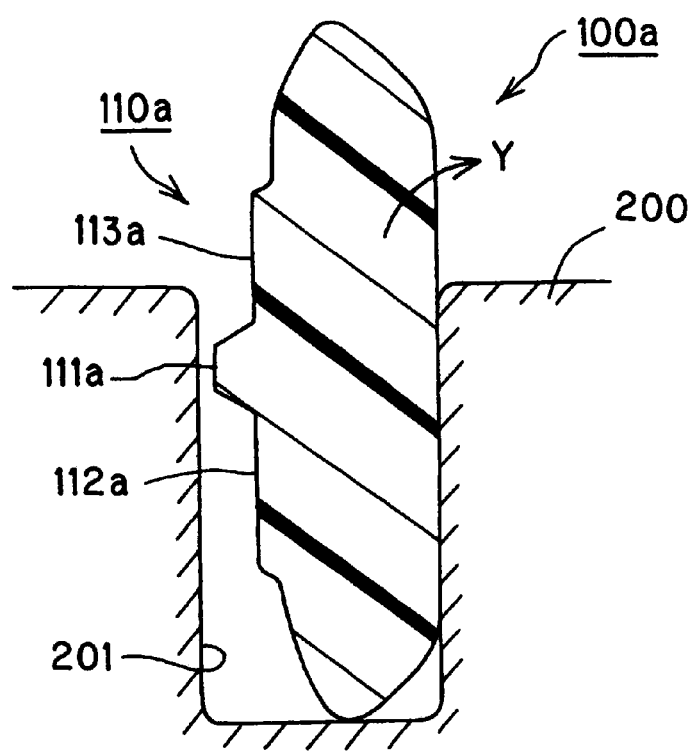
FIG. 6 is a schematic cross sectional view showing a state in which a gasket is fitted in a groove according to a comparison example.

As described above, according to the gasket 100 of this embodiment, the protruded part 110 for stabilizing the posture of the gasket 100 is constructed in such a manner that the amounts of protrusion of the individual portions thereof are different from one another according to the requirements which are demanded to the individual portions, respectively. Consequently, according to the gasket 100 of this embodiment, it is possible to suppress the buckling and falling of the gasket, while suppressing the increase in the repulsive force at the time when the gasket is compressed by the head cover 200 and the cylinder head 300. For that reason, the posture of the gasket 100 can be stabilized, thereby making it possible to improve the sealing performance thereof. This will be explained in more detail by the use of a comparative example shown in FIG. 6. FIG. 6 is a schematic cross sectional view showing a state in which a gasket is fitted in a groove, according to the comparison example.

In a gasket 100a according to the comparative example, similar to the case of the gasket 100 according to this embodiment, a protruded part 110a for stabilizing the posture of the gasket 100a in a groove 201 is formed on a side surface of the gasket 100a at a side thereof which is in the hermetic seal area. In addition, this protruded part 110a is also of a three-step structure which includes a first protruded portion 111a that is formed along the vicinity of the center of a gasket main body, a second protruded portion 112a that is formed at the side of a head cover 200 (i.e., at the side of a groove bottom), and a third protruded portion 113a that is formed at the side of a cylinder head 300.

However, in this comparative example, it is constructed such that the amount of protrusion of the first protruded portion 111a is the largest, and the amount of protrusion of the second protruded portion 112a and the amount of protrusion of the third protruded portion 113a are equal to each other.

In the case of the gasket 100a according to this comparative example, in cases where the amounts of protrusion of the second protruded portion 112a and the third protruded portion 113a are set with priority given to low repulsive force, when the gasket 100a is compressed, the deformation of the gasket 100a (i.e., deformation in the direction of an arrow Y in FIG. 6) in the vicinity of the side of the cylinder head 300 becomes large. For this reason, it becomes difficult to suppress the falling of the gasket 100a in the groove 201.

On the contrary, in cases where the amounts of protrusion of the second protruded portion 112a and the third protruded portion 113a are set with priority given to the prevention of falling, when the gasket 100a is compressed, the filling rate thereof in the vicinity of the groove bottom becomes high, and the repulsive force becomes too large.

Thus, in the case of the gasket 100a according to the comparative example, it is difficult to achieve compatibility of low repulsive force and the stabilization of the posture of the gasket 100a in the groove 201.

In addition, in the gasket 100 according to this embodiment, it is constructed such that the protrusions 120 for preventing the gasket 100 from coming out of the groove 201 are arranged at locations which are nearer to the groove bottom than the center position of the gasket main body, and at which they are received in the groove 201 in the state where the gasket 100 is fitted in the groove 201 and is not sandwiched between the head cover 200 and the cylinder head 300. Accordingly, mountability of the gasket 100 at the time of fitting the gasket 100 into the groove 201 is excellent, and the gasket 100 can be mounted or fitted therein in an easy manner.

Figure 7:
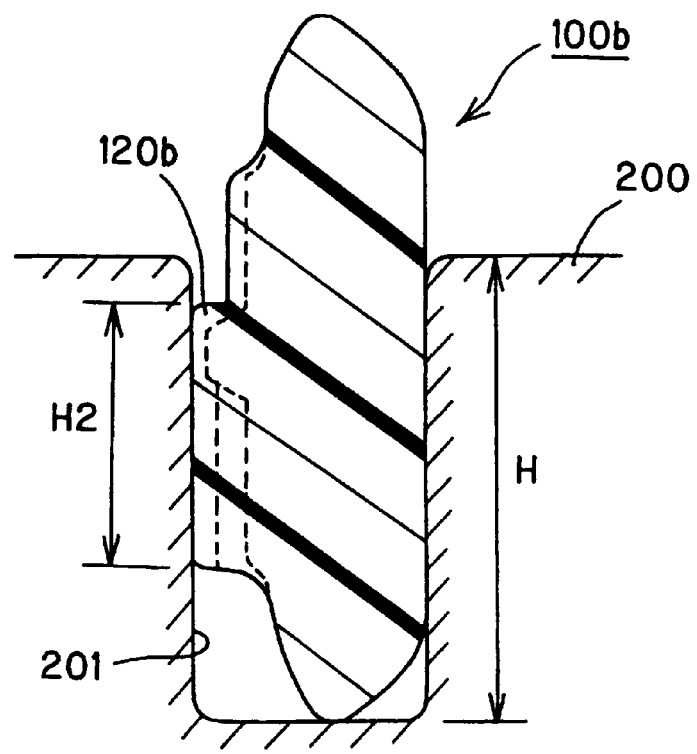
FIG. 7 is another schematic cross sectional view showing a state in which the gasket is fitted in the groove according to the comparison example.

Moreover, the dimension in the groove depth direction of the protrusions 120 is set to be equal to or more than 30% and equal to or less than 50% with respect to the depth dimension of the groove 201. Accordingly, an increase in the filling rate of the gasket 100 in the groove 201 can be suppressed, and an increase in repulsive force can also be suppressed. This will be explained in more detail by the use of a comparative example shown in FIG. 7. FIG. 7 is a schematic cross sectional view showing a state in which a gasket is fitted in a groove, according to the comparison example.

In a gasket 100b according to the comparative example shown in FIG. 7, too, similar to the case of the gasket 100 according to this embodiment, protrusions 120b for preventing the gasket 100 from coming out of a groove 201 are formed on a side surface of the gasket 100b at a side thereof which is in a hermetic seal area. Here, note that the construction of a protruded part is the same as that in the case of this embodiment.

In addition, in this example, the dimension in a groove depth direction of the protrusions 120b (dimension H2 in FIG. 7) is set to exceed 50% with respect to the depth dimension of the groove 201 (dimension H in FIG. 7).

In the case of the gasket 100b according to this comparative example, the filling rate of the gasket with respect to the groove 201 in the vicinity of locations at which the protrusions 120b for preventing the come-off of the gasket 100b are formed becomes high. As a result, it is difficult to fit or mount the gasket 100b into the groove 201, and the gasket 100b may buckle or fall at the time of mounting operation.

Here, note that in the above-mentioned embodiment, an example has been shown in which the gasket is fitted into the groove formed in the head cover, but the present invention is not limited to this. The present invention can be applied to other than this, such as for example a timing belt cover, an air cleaner, an intake manifold, etc., and it goes without saying that in such a case, too, the same operational effects as in the case of this embodiment are obtained.

EXPLANATION OF REFERENCE NUMERALS AND CHARACTERS

100 Gasket
110 Protruded part
111 First protruded portion
112 Second protruded portion
113 Third protruded portion
120 Protrusions
200 Head cover
201 Groove
300 Cylinder head

The invention claimed is:

1. A sealing assembly, comprising:
a first member including a groove having an inner peripheral wall surface and an outer peripheral wall surface extending between an closed end and an open end of the groove;
a second member adapted to be mounted to the second member;
a gasket which is fitted in the groove formed in the first member and which serves to seal a gap between the first member and the second member, the gasket including a gasket body including a protruded part that is continuously formed along an entire inner peripheral surface of the gasket body and extends radially inward from a first inner peripheral surface and a second inner peripheral surface of the gasket body, said protruded part being formed such that it protrudes toward a hermetic seal area side in a range in which the protruded part of the gasket body is out of contact with the inner peripheral wall surface of the groove, in a state where the gasket body is fitted in said groove and is not sandwiched by said first member and said second member, whereas it is in contact with the inner peripheral wall surface of the groove thereby to stabilize the posture of the gasket body in the groove, in a state where the gasket body is sandwiched by said first member and said second member; and said protruded part is of a stepped structure which includes: a first protruded portion protruding toward said hermetic seal area side with the largest amount of protrusion that is formed along the vicinity of a center of the gasket body; a second protruded portion directly adjacent to the first inner peripheral surface of the gasket body and protruding toward said hermetic seal area side with the smallest amount of protrusion that is formed at a location nearer to the closed end of the groove than the first protruded portion; and a third protruded portion directly adjacent to the second inner peripheral surface of the gasket body and protruding toward said hermetic seal area side that is formed at a location further from the closed end of the groove than the first protruded portion, and has an amount of protrusion which is smaller than that of the first protruded portion, and larger than that of the second protruded portion, said first inner peripheral surface extending between said closed end of said groove and said second protruded portion and said second inner peripheral surface extending away from said closed end of said groove to a greater extent than said third protruded portion.

2. The gasket as set forth in claim 1, wherein:
protrusions, which serve to prevent the gasket body from coming out of the groove by being in contact with an inner wall surface of the groove even in a state where the gasket body is fitted in said groove and is not sandwiched by said two members, are formed in plurality in a longitudinal direction of the gasket body at intervals therebetween, respectively, and
said protrusions are arranged at locations which are nearer to a groove bottom than a center position of the gasket body, and at which they are received in the groove in a state where the gasket is fitted in said groove and is not sandwiched by said two members.

3. The gasket as set forth in claim 2, wherein the dimension in a groove depth direction of said protrusions is set to be equal to or more than 30% and equal to or less than 50% with respect to the depth dimension of said groove.

* * * * *

UNITED STATES PATENT AND TRADEMARK OFFICE
CERTIFICATE OF CORRECTION

PATENT NO. : 9,027,936 B2
APPLICATION NO. : 13/125167
DATED : May 12, 2015
INVENTOR(S) : Shuji Yoshitsune et al.

It is certified that error appears in the above-identified patent and that said Letters Patent is hereby corrected as shown below:

On the Title Page:

At column 1, line number 7, at (73) Assignees, delete "Nok" and insert --NOK-- therefore.

At column 1, line number 7, at (73) Assignees, delete "Mahle" and insert --MAHLE-- therefore.

Signed and Sealed this
Ninth Day of August, 2016

Michelle K. Lee
*Director of the United States Patent and Trademark Office*